United States Patent [19]
Cottevieille

[11] Patent Number: 5,440,888
[45] Date of Patent: Aug. 15, 1995

[54] APPARATUS FOR TRANSFERRING LIQUID HELIUM BETWEEN TWO DEVICES AT DIFFERENT POTENTIALS

[75] Inventor: Christian Cottevieille, Montreuil, France

[73] Assignee: GEC Alsthom Electromecanique SA, Paris, France

[21] Appl. No.: 255,742

[22] Filed: Jun. 7, 1994

[30] Foreign Application Priority Data

Jun. 8, 1993 [FR] France ............... 93 06841

[51] Int. Cl.⁶ .................................... F17C 13/00
[52] U.S. Cl. ..................... 62/50.7; 62/51.1; 62/51.3
[58] Field of Search ......... 62/50.7, 51.1, 51.3; 138/114

[56] References Cited

U.S. PATENT DOCUMENTS

| | | | |
|---|---|---|---|
| 2,980,448 | 4/1961 | Holben | 62/50.7 X |
| 2,981,278 | 4/1961 | Bergson | 62/50.7 X |
| 3,302,419 | 2/1967 | Walter | 62/50.7 |
| 3,386,256 | 6/1968 | Alexander | 62/50.7 |
| 3,433,028 | 3/1969 | Klee | 62/50.7 |
| 3,466,806 | 9/1969 | Doose et al. | 62/50.7 |
| 3,706,208 | 12/1972 | Kadi et al. | 62/50.7 |
| 3,904,394 | 9/1975 | Prast et al. | 62/50.7 |
| 3,945,215 | 3/1976 | Johnson et al. | 62/50.7 |
| 3,986,341 | 10/1976 | DeHaan | 62/50.7 |
| 3,992,169 | 11/1976 | London | 62/50.7 |
| 4,011,732 | 3/1977 | Doherty et al. | 62/50.7 |
| 4,207,745 | 6/1980 | Pouillange | 62/50.7 |
| 4,492,089 | 1/1985 | Rohner et al. | 62/50.7 |
| 4,538,277 | 8/1985 | Benett et al. | 372/33 |
| 4,667,390 | 5/1987 | Acharya et al. | 62/50.7 X |
| 4,745,760 | 5/1988 | Porter | |
| 5,072,591 | 12/1991 | Grange et al. | 62/50.7 |
| 5,131,429 | 7/1992 | Nixon | 62/50.7 X |
| 5,201,184 | 4/1993 | Roth | 62/51.1 X |
| 5,347,251 | 9/1994 | Arrendale | 62/51.3 X |

OTHER PUBLICATIONS

F. Schauer, "Transport of Cryogenic Liquids or Gases Between Installations at Different Electrical Potentials", Cryogenics, Dec. 1981—pp. 735-739.
French Search Report FR 9306841.

Primary Examiner—Christopher Kilner
Attorney, Agent, or Firm—Sughrue, Mion, Zinn, Macpeak & Seas

[57] ABSTRACT

An apparatus for transferring liquid helium between axially spaced first and second endpieces, being fixed thereto at opposite ends and having an intermediate insulative portion. An outer conduit of larger diameter concentrically surrounds the internal cryogen delivery conduit and also extends between and is fixed at opposite ends to the two endpieces. The outer conduit has an insulative portion, with the insulative portions of the internal cryogen delivery conduit and the outer conduit electrically insulating the first endpiece from the second endpiece. An annular space between the internal cryogen delivery conduit and the coaxial outer conduit is subject to vacuum pressure via a pumping passage within one of the endpieces which connects to that annular space and which may be connected to a pump for providing the vacuum within that space. Fins are disposed about the periphery of the coaxial outer conduit. As a result, the second endpiece may be connected to a device at a second voltage significantly different from a first voltage connected to the first endpiece.

2 Claims, 1 Drawing Sheet

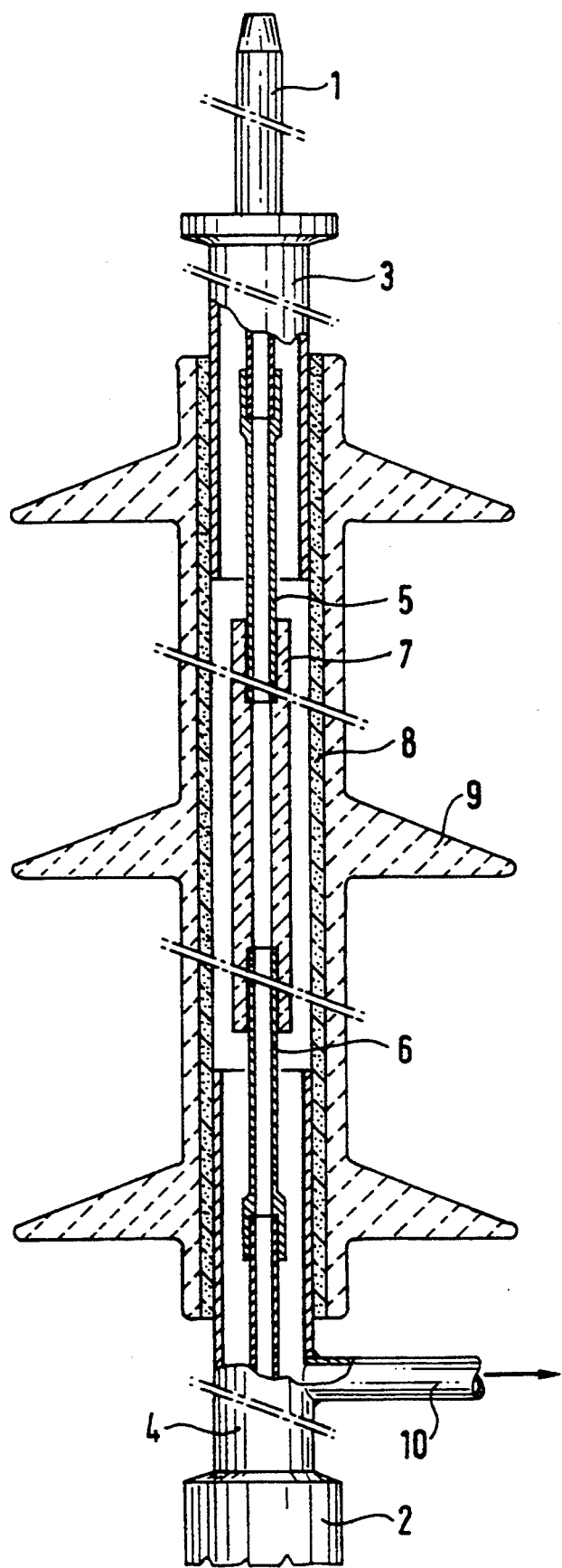

APPARATUS FOR TRANSFERRING LIQUID HELIUM BETWEEN TWO DEVICES AT DIFFERENT POTENTIALS

The present invention relates to connections intended for supplying liquid helium from a reservoir or condenser for helium at ground potential, to a cryogenic installation at high voltage, and relates in particular to apparatus for transferring liquid helium between two devices at different potentials.

BACKGROUND OF THE INVENTION

State-of-the-art apparatuses for transferring liquid helium comprise metal connections constituted by two co-axial tubes, an internal tube conveying the liquid helium and an external tube supporting a vacuum, to provide thermal insulation for the liquid-helium-conveying internal tube.

The internal and external tubes are connected to endpieces by vacuum-tight welds.

State-of-the-art apparatuses for transferring liquid helium do not enable liquid helium to be supplied to cryogenic installations which are connected to high voltage, from a reservoir or a condenser for helium which is connected to ground.

OBJECTS AND SUMMARY OF THE INVENTION

An object of the apparatus of the invention is to alleviate this drawback in apparatus for transferring liquid helium between two devices at different potentials.

A further object of the invention is to ensure that in apparatus for transferring liquid helium between two devices at different potentials, and while the liquid helium is being supplied, there is electrical isolation between the cryogenic installation which is connected to the high voltage and the liquid helium reservoir or condenser which is connected to ground.

The invention provides apparatus for transferring liquid helium between two devices at different potentials, the apparatus comprising:
  first and second endpieces;
  first and second metal endpiece tubes;
  first and second internal metal tubes for conveying liquid helium;
  internal insulating connection means;
  external insulating connection means having fins disposed around the periphery thereof; and
  a pumping passage.

According to another feature of the invention, the apparatus for transferring liquid helium between two devices at different potentials is such that:
  respective ends of the first internal metal tube for conveying liquid helium penetrate inside the first metal endpiece tube and inside one end of the internal insulating connection means;
  respective ends of the second internal metal tube for conveying liquid helium penetrate inside the second metal endpiece tube and inside the other end of the internal insulating connection means;
  respective ends of the external insulating connection means, having fins disposed around the periphery thereof, enclose the first and the second metal endpiece tubes;
  the first and second endpieces are secured to the first and second metal endpiece tubes respectively; and
  the pumping passage is disposed on one of the metal endpiece tubes.

An advantage of the apparatus of the invention for transferring liquid helium is that it can readily be adapted to prior art reservoirs and condensers.

A further advantage of the apparatus of the invention for transferring liquid helium is that it can be removed by conventional methods, if the transfer of liquid helium is not required or in the case of deterioration, without requiring significant disturbance to the installation. By way of example, the apparatuses for transferring liquid helium which are described by F. Schauer in the journal Cryogenics of December 1981, pages 735 to 739, and by J. Gerhold in the journal Cryogenics of February 1984, pages 73 to 82, do not have this advantage.

BRIEF DESCRIPTION OF THE DRAWING

Other objects, features and advantages of the apparatus of the invention for transferring liquid helium will be more clearly apparent on reading the description of the preferred embodiment shown in the accompanying drawing in which:
  the single FIGURE is a longitudinal section view of apparatus of the invention.

MORE DETAILED DESCRIPTION

In the preferred embodiment shown in the single FIGURE, the apparatus for transferring liquid helium between two devices at different potentials comprises first and second endpieces 1 and 2, first and second metal endpiece tubes 3 and 4, first and second internal metal tubes 5 and 6 for conveying liquid helium, internal insulating connection means 7, external insulating connection means 8 having fins 9 disposed around the periphery thereof, and a pumping passage 10.

The first and second endpieces 1 and 2 are respectively secured to the first and second metal endpiece tubes 3 and 4.

The first and second metal endpiece tubes 3 and 4 ensure thermal insulation of the first and second internal metal tubes 5 and 6 for conveying liquid helium.

Respective ends of the first internal metal tube 5 for conveying liquid helium penetrate inside the first metal endpiece tube 3 and inside one end of the internal insulating connection means 7.

Respective ends of the second internal metal tube 6 for conveying liquid helium penetrate inside the second metal endpiece tube 4 and inside the other end of the internal insulating connection means 7.

Respective ends of the external insulating connection means 8, that has fins 9 disposed around the periphery thereof, enclose the first and second metal endpiece tubes 3 and 4.

The pumping passage 10 is disposed on one of the metal endpiece tubes 3, 4.

In the preferred embodiment shown the first and second endpieces 1 and 2 are secured to the first or second metal endpiece tubes 3 or 4 by means of vacuum-tight welds.

The first and second endpieces 1 and 2 are preferably of the male and the female type. The first endpiece 1 may, for example, be introduced into a reservoir or a condenser (not shown) connected to ground. The second endpiece 2 is then coupled, for example, to a cryostat (not shown) connected to the high voltage.

The first and second metal endpiece tubes 3 and 4 are connected together by means of the external insulating connection means 8 which are generally cylindrical in shape.

The first and second metal endpiece tubes 3 and 4 are, for example, type 304L stainless steel tubes of diameter 23×35.

The first and second internal metal tubes 5 and 6 for conveying liquid helium are, for example, type 304L stainless steel tubes of diameter 6×8.

The internal insulating connection means 7 are, for example, of alumina and are generally tubular in shape.

By way of example, the length of the internal insulating connection means 7 is of the order of 400 mm.

The second external insulating connection means 8 are formed by a filamentary winding of a glass-resin material.

The fins 9 disposed around the periphery of the external insulating connection means 8 are made of a known type of elastomeric material.

The external insulating connection means 8 and the fins 9 disposed around the periphery of said means 8 therefore constitute a composite insulator 8, 9.

By way of example, the length of said composite insulator 8, 9 is of the order of 620 mm for a voltage level of 63 kV. This length is a function of the voltage level to be withstood.

The fins 9 disposed around the periphery of the external insulating connection means 8 are, for example, made of an elastomer. The purpose of these fins 9 is to increase the creepage path.

By way of example, the longitudinal separation of two successive fins 9 is of the order of 130 mm.

The pumping endpiece 10 is situated at a sufficient distance from the end of the composite insulator 8, 9 to be located in a zone where the electric field is very weak.

An isolating valve and pumping means (not shown) are disposed at the end of the pumping passage.

In a particular embodiment, the internal insulating connection means 7, which electrically insulate the first and second internal tubes 5 and 6 for conveying liquid helium, is constructed of a ceramic-metal connection and is tubular in shape. This ceramic connection may be of alumina or any other similar material.

The composite insulator 8, 9, which electrically insulates the first and second metal endpiece tubes 3 and 4, is constituted by a tube of epoxy glass constructed of a filamentary winding. The fins 9 are of elastomer and are disposed around the periphery of the external insulating means 8, by injection-moulding for example.

The vacuum-tightness of these connections is ensured by known means.

In another particular embodiment, the external insulating means 8 are constructed of a ceramic-metal connection.

Finally, depending on the voltage level, it may be advantageous to use protection straps (not shown) intended to keep arcing away from the composite insulator 8, 9 in the event of arc-over. By way of example, for a voltage level of 63 kV, these straps will be limited to the high voltage end of the liquid helium transfer apparatus.

I claim:

1. An apparatus for transferring liquid helium between axially spaced first and second endpieces, the first endpiece being connected to a device at a first voltage, the second end piece being connected to a device at a second voltage different from the first voltage, said apparatus comprising:
   an internal cryogen delivery conduit extending between said two end pieces and being respectively coupled thereto at opposite ends thereof, said internal cryogen delivery conduit further having an insulative portion between said ends thereof;
   an outer conduit coaxial with said internal cryogen delivery conduit extending between said two endpieces and being connected thereto, said outer conduit having an insulative portion, said insulative portions of internal cryogen delivery conduit and said coaxial outer conduit electrically insulating the first endpiece from the second endpiece, said coaxial outer conduit being concentrically spaced from said internal cryogen delivery conduit and forming an annular space therebetween;
   a pumping passage for connecting said annular space to a pump for providing a vacuum in said annular space; and
   fins disposed about the periphery of said coaxial outer conduit.

2. An apparatus according to claim 1, wherein the first and second endpieces are respectively secured to first and second metal endpiece tube;
   said internal cryogen delivery conduit having at least first and second internal metal tubes and an internal insulating tube with first and second ends, one end of each of said first and second internal metal tubes penetrating inside respectively said first and second ends of said internal insulating tube;
   said coaxial outer conduit having first and second outer metal tubes respectively secured to said first and second end pieces, and an outer insulating tube with first and second ends and an external peripheral surface, said fins being located on said external peripheral surface, and one end of each of said first and second outer metal tubes penetrating inside respectively said first and second ends of said outer insulating tube.

* * * * *